US006527254B1

(12) United States Patent
Prevete

(10) Patent No.: US 6,527,254 B1
(45) Date of Patent: Mar. 4, 2003

(54) SELF-CONTAINED VEHICULAR JACKING SYSTEM

(76) Inventor: Michael Prevete, 7409 Avenue "W", Brooklyn, NY (US) 11234

( * ) Notice: Subject to any disclaimer, the term of this patent is extended or adjusted under 35 U.S.C. 154(b) by 0 days.

(21) Appl. No.: 09/960,060

(22) Filed: Sep. 21, 2001

(51) Int. Cl.[7] .................................................. B60S 9/02

(52) U.S. Cl. ................ 254/423; 254/89 H; 254/93 VA; 254/418

(58) Field of Search ................................ 254/423, 418, 254/93 VA, 93 R, DIG. 1, DIG. 4, 89 H

(56) References Cited

U.S. PATENT DOCUMENTS

| | | | | |
|---|---|---|---|---|
| 5,188,379 A | * | 2/1993 | Krause et al. | 254/423 |
| 5,713,560 A | * | 2/1998 | Guarino | 254/423 |
| 5,722,641 A | * | 3/1998 | Martin et al. | 254/423 |
| 5,765,810 A | * | 6/1998 | Mattera | 254/423 |

* cited by examiner

*Primary Examiner*—Lee Wilson

(57) ABSTRACT

A self-contained vehicular jacking system for raising a portion or portions of a vehicle off the ground automatically by depressing associated control buttons from within the vehicle. The self-contained vehicular jacking system includes a compressed air tank pneumatically coupled to pneumatic cylinders positioned near the wheels of a vehicle. The cylinders are controlled from inside the vehicle by activation of buttons on a control panel, thereby selectively raising portions of the vehicle for service.

1 Claim, 3 Drawing Sheets

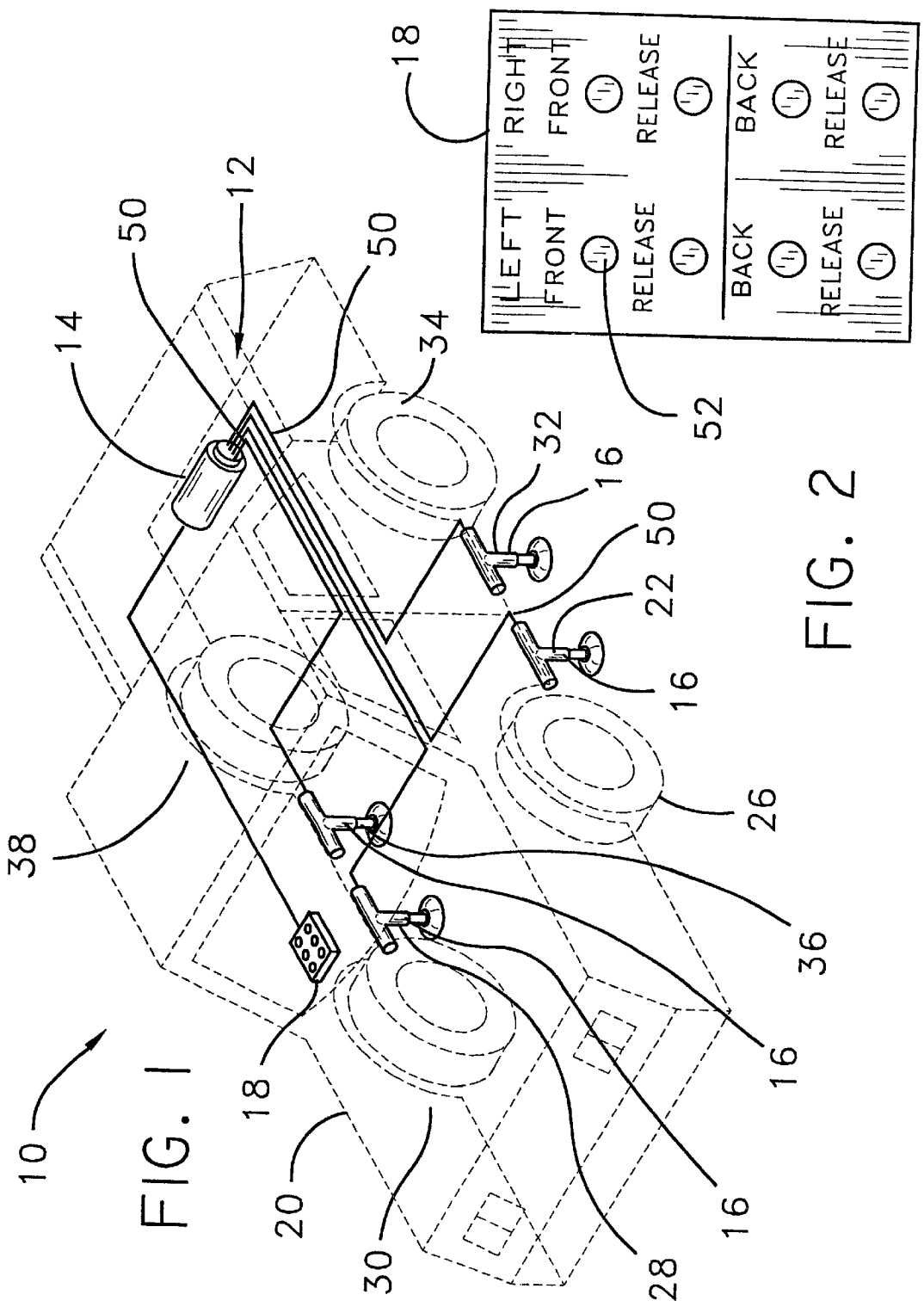

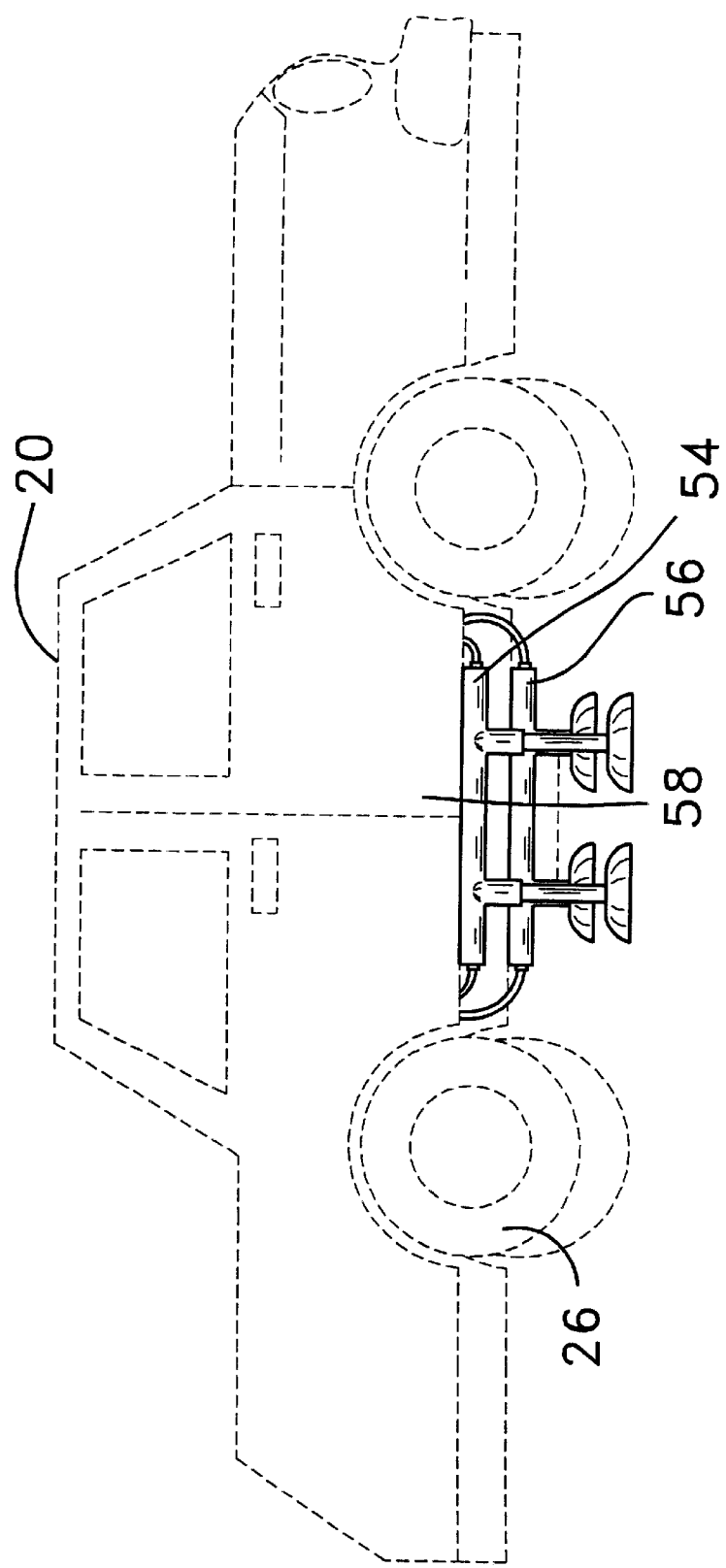

SELF-CONTAINED VEHICULAR JACKING SYSTEM

BACKGROUND OF THE INVENTION

1. Field of the Invention

The present invention relates to vehicle jacks and more particularly pertains to a new self-contained vehicular jacking system for raising a portion or portions of a vehicle off the ground automatically by depressing associated control buttons from within the vehicle.

2. Description of the Prior Art

The use of vehicle jacks is known in the prior art. More specifically, vehicle jacks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,224,688; 6,079,742; 5,765,810; 5,465,940; 5,232,206; and 5,143,386.

While these devices fulfill their respective, particular objectives and requirements, the aforementioned patents do not disclose a new self-contained vehicular jacking system. The inventive device includes a compressed air tank pneumatically coupled to pneumatic cylinders positioned near the wheels of a vehicle. The cylinders are controlled from inside the vehicle by activation of buttons on a control panel, thereby selectively raising portions of the vehicle for service.

In these respects, the self-contained vehicular jacking system according to the present invention substantially departs from the conventional concepts and designs of the prior art, and in so doing provides an apparatus primarily developed for the purpose of raising a portion or portions of a vehicle off the ground automatically by depressing associated control buttons from within the vehicle.

SUMMARY OF THE INVENTION

In view of the foregoing disadvantages inherent in the known types of vehicle jacks now present in the prior art, the present invention provides a new self-contained vehicular jacking system construction wherein the same can be utilized for raising a portion or portions of a vehicle off the ground automatically by depressing associated control buttons from within the vehicle.

The general purpose of the present invention, which will be described subsequently in greater detail, is to provide a new self-contained vehicular jacking system apparatus and method which has many of the advantages of the vehicle jacks mentioned heretofore and many novel features that result in a new self-contained vehicular jacking system which is not anticipated, rendered obvious, suggested, or even implied by any of the prior art vehicle jacks, either alone or in any combination thereof.

To attain this, the present invention generally comprises a compressed air tank pneumatically coupled to pneumatic cylinders positioned near the wheels of a vehicle. The cylinders are controlled from inside the vehicle by activation of buttons on a control panel, thereby selectively raising portions of the vehicle for service.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new self-contained vehicular jacking system apparatus and method which has many of the advantages of the vehicle jacks mentioned heretofore and many novel features that result in a new self-contained vehicular jacking system which is not anticipated, rendered obvious, suggested, or even implied by any of the prior art vehicle jacks, either alone or in any combination thereof.

It is another object of the present invention to provide a new self-contained vehicular jacking system which may be easily and efficiently manufactured and marketed.

It is a further object of the present invention to provide a new self-contained vehicular jacking system which is of a durable and reliable construction.

An even further object of the present invention is to provide a new self-contained vehicular jacking system which is susceptible of a low cost of manufacture with regard to both materials and labor, and which accordingly is then susceptible of low prices of sale to the consuming public, thereby making such self-contained vehicular jacking system economically available to the buying public.

Still yet another object of the present invention is to provide new self-contained vehicular jacking system which provides in the apparatuses and methods of the prior art some of the advantages thereof, while simultaneously overcoming some of the disadvantages normally associated therewith.

Still another object of the present invention is to provide a new self-contained vehicular jacking system for raising a portion or portions of a vehicle off the ground automatically by depressing associated control buttons from within the vehicle.

Yet another object of the present invention is to provide a new self-contained vehicular jacking system which includes a compressed air tank pneumatically coupled to pneumatic cylinders positioned near the wheels of a vehicle. The cylinders are controlled from inside the vehicle by activation of buttons on a control panel, thereby selectively raising portions of the vehicle for service.

Still yet another object of the present invention is to provide a new self-contained vehicular jacking system that is capable of raising a portion of the vehicle from a control panel inside the vehicle.

Even still another object of the present invention is to provide a new self-contained vehicular jacking system that would alleviate the problems involved with jacking up a vehicle to change a tire, especially when the weather outside the vehicle is inclement. It would also allow those users typically unable to jack up the vehicle to do so thereby allowing them to potentially change a flat tire.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new self-contained vehicular jacking system according to the present invention.

FIG. 2 is a front view of the control panel of the present invention.

FIG. 4 is a perspective view of an alternative embodiment of the present invention.

DESCRIPTION OF THE PREFERRED EMBODIMENT

Figure 3:
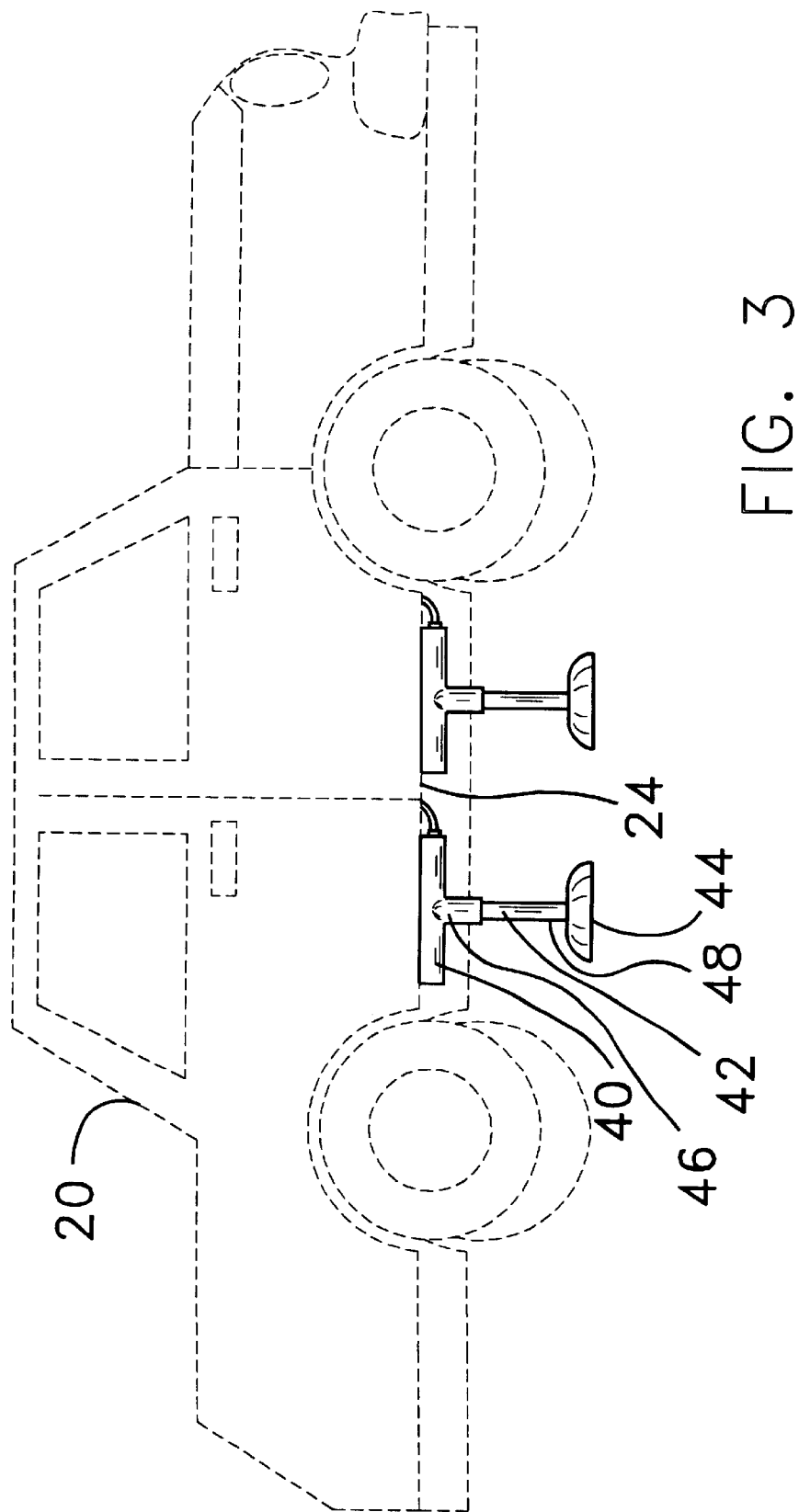
FIG. 3 is a perspective view of the preferred embodiment of the present invention.

With reference now to the drawings, and in particular to FIGS. 1 through 4 thereof, a new self-contained vehicular jacking system embodying the principles and concepts of the present invention and generally designated by the reference numeral 10 will be described.

As best illustrated in FIGS. 1 through 4, the self-contained vehicular jacking system 10 generally comprises a pneumatic system 12. The pneumatic system 12 comprises an air holding tank 14 and a plurality of pneumatic cylinders 16. The pneumatic system 12 is operationally coupled to a control panel 18. The control panel 18 is positioned inside a vehicle 20 such that the pneumatic system 12 is designed for selectively extending and retracting the pneumatic cylinders 16 for the purpose of raising the vehicle 20 off of the ground thereby allowing wheels or an undercarriage portion of the vehicle 20 to be serviced.

The air holding tank 14 of the pneumatic system 12 is fixedly coupled to the vehicle 20 and is positioned such that the air holding tank 14 is accessible to a user for the purpose of filling the air holding tank 14 with compressed air. The air holding tank 14 is designed for selectively providing the pneumatic cylinders 16 with compressed air.

The plurality of pneumatic cylinders 16 includes a front left cylinder member 22. The front left cylinder member 22 is fixedly coupled to a frame portion 24 of the vehicle 20 proximate a front left tire 26 of the vehicle 20 such that the front left cylinder member 22 is designed for raising the front left tire 26 off of the ground.

The plurality of pneumatic cylinders 16 includes a front right cylinder member 28. The front right cylinder member 28 is fixedly coupled to a frame portion 24 of the vehicle 20 proximate a front right tire 30 of the vehicle 20 such that the front right cylinder member 28 is designed for raising the front right tire 30 off of the ground.

The plurality of pneumatic cylinders 16 includes a back left cylinder member 34. The back left cylinder member 34 is fixedly coupled to a frame portion 24 of the vehicle 20 proximate a back left tire 34 of the vehicle 20 such that the back left cylinder member 34 is designed for raising the back left tire 34 off of the ground.

The plurality of pneumatic cylinders 16 includes a back right cylinder member 36. The back right cylinder member 36 is fixedly coupled to a frame portion 24 of the vehicle 20 proximate a back right tire 38 of the vehicle 20 such that the back right cylinder member 36 is designed for raising the back right tire 38 off of the ground.

Each of the plurality of pneumatic cylinders 16 of the pneumatic system 12 comprises a mounting portion 40, a cylinder portion 42, and a support portion 44.

The mounting portion 40 is located proximate an upper end 46 of the cylinder portion 42. The mounting portion 40 is designed for being fixedly coupled to the frame portion 24 of the vehicle 20. The support portion 44 is positioned proximate a lower end 48 of the cylinder portion 42. The cylinder portion 42 is designed for receiving compressed air from the air holding tank 14 thereby biasing the support portion 44 of the downwardly until contacting the ground thus biasing the vehicle 20 upwardly.

Each of the pneumatic cylinders 16 includes an air line 50. The air lines 50 are designed for pneumatically coupling the air holding tank 14 to the pneumatic cylinders 16.

The control panel 18 includes a plurality of control buttons 52. The control buttons 52 are accessible to the user such that the control buttons 52 of the control panel 18 are designed for selectively controlling an amount of compressed air delivered to the pneumatic cylinders 16 from the air holding tank 14 as desired.

As an alternate embodiment, the plurality of the pneumatic cylinders 16 includes left side cylinders member 54 and right side cylinder member 56. Each of the cylinders members is designed for selectively raising an associated side of the vehicle 20 thereby allowing both tires on the raised side 58 to be serviced.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-contained vehicular jacking system for raising a vehicle off of the ground, said system comprising:

a pneumatic system, said pneumatic system comprising an air holding tank and a plurality of pneumatic cylinders, said air holding tank being adapted for selectively providing said plurality of pneumatic cylinders with compressed air, said pneumatic system being operationally coupled to a control panel, said control panel being positioned inside the vehicle such that said pneumatic system being adapted for selectively extending said plurality of pneumatic cylinders for the purpose of selectively raising the vehicle off of the ground to facilitate servicing of the vehicle;

wherein said plurality of pneumatic cylinders includes:

a front left cylinder member, said front left cylinder member being fixedly coupled to a frame portion of the vehicle proximate a front left tire of the vehicle, wherein said front left cylinder member is for raising the front left section of the vehicle so that the front left tire is off of the ground;

a front right cylinder member, said front right cylinder member being fixedly coupled to a frame portion of the vehicle proximate a front right tire of the vehicle, wherein said front right cylinder member is for raising the front right section of the vehicle to that the front right tire is off of the ground;

a back left cylinder member, said back left cylinder member being fixedly coupled to a frame portion of the vehicle proximate a back left tire of the vehicle, wherein said back left cylinder member is for raising the back left section of the vehicle so that the back left tire is off of the ground; and a back right cylinder member, said back right cylinder member being fixedly coupled to a frame portion of the vehicle proximate a back right tire of the vehicle, wherein said back right cylinder member is for raising the back right section of the vehicle so that the back right tire off of the ground;

wherein said front left cylinder and said back left cylinder are in fluid communication with each other such that said front and back left cylinders are extendable simultaneously, wherein said front right cylinder and said back right cylinder are in fluid communication with each other such that said front and back right cylinders are extendable simultaneously;

said air holding tank of said pneumatic system being fixedly coupled to the vehicle and being positioned such that said air holding tank is accessible to a user for the purpose of filling said air holding tank with compressed air;

each of said plurality of pneumatic cylinders of said pneumatic system comprising a mounting portion, a cylinder portion, and a support portion, said mounting portion being located proximate an upper end of said cylinder portion, said mounting portion being adapted for being fixedly coupled to the frame portion of the vehicle, said support portion being positioned proximate a lower end of said cylinder portion, said cylinder portion being adapted for receiving compressed air from said air holding tank thereby biasing said support portion of said cylinder downwardly until contacting the ground thus biasing the vehicle upwardly;

each of said pneumatic cylinder including an air line, each of said air lines being adapted for pneumatically coupling said air holding tank to a respective one of said pneumatic cylinders; said control panel including a plurality of control buttons, each of said control buttons being accessible to the user such that said control buttons of said control panel are for selectively controlling an amount of compressed air delivered to each of said pneumatic cylinders from said air holding tank;

wherein said front left and back left cylinders are rigidly connected together; and wherein said front right and back right cylinders are rigidly connected together.

* * * * *